(12) United States Patent
Umetsu et al.

(10) Patent No.: US 11,840,146 B2
(45) Date of Patent: Dec. 12, 2023

(54) CONTROL METHOD FOR VEHICLE, VEHICLE SYSTEM, AND VEHICLE CONTROLLER

(71) Applicant: MAZDA MOTOR CORPORATION, Hiroshima (JP)

(72) Inventors: Daisuke Umetsu, Hiroshima (JP); Osamu Sunahara, Hiroshima (JP); Daisaku Ogawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 805 days.

(21) Appl. No.: 16/965,947

(22) PCT Filed: Jan. 29, 2019

(86) PCT No.: PCT/JP2019/002877
§ 371 (c)(1),
(2) Date: Jul. 29, 2020

(87) PCT Pub. No.: WO2019/151208
PCT Pub. Date: Aug. 8, 2019

(65) Prior Publication Data
US 2021/0039504 A1    Feb. 11, 2021

(30) Foreign Application Priority Data
Feb. 2, 2018   (JP) .................. 2018-017254

(51) Int. Cl.
*B60L 15/20*       (2006.01)
*B60L 7/18*        (2006.01)
(Continued)

(52) U.S. Cl.
CPC ............ *B60L 15/2009* (2013.01); *B60L 7/18* (2013.01); *B60L 7/26* (2013.01); *B60W 10/08* (2013.01);
(Continued)

(58) Field of Classification Search
None
See application file for complete search history.

(56) References Cited

FOREIGN PATENT DOCUMENTS

| JP | 6229879 B2 | 11/2017 | |
|---|---|---|---|
| WO | WO-2015083198 A1 * | 6/2015 | .............. B60T 7/042 |
| WO | WO-2017217256 A1 * | 12/2017 | .............. B60R 21/00 |

OTHER PUBLICATIONS

1NRITTEN Opinion issued in PCT/JP2019/002877; dated Mar. 12, 2019.

(Continued)

*Primary Examiner* — Melanie Torres Williams
(74) *Attorney, Agent, or Firm* — Studebaker & Brackett PC

(57) ABSTRACT

In a control method for a vehicle and a vehicle controller that add deceleration to a vehicle so as to control a vehicle posture when a turning operation of a steering system is performed, the deceleration is appropriately set on the basis of an operation of a single pedal. The control method for the vehicle includes: a step of adding the deceleration that corresponds to an accelerator pedal depression amount to a vehicle 1 when the accelerator pedal depression amount is smaller than a specified value A1 that is larger than 0; a step of determining whether the turning operation of the steering system is performed on the basis of a steering angle detected by a steering angle sensor 8; a step of adding the deceleration to the vehicle 1 so as to control the vehicle posture when it is determined that the turning operation of the steering system is performed; and a step of setting the deceleration added to the vehicle to a smaller value when the accelerator pedal depression amount is smaller than the specified value and is a first value than when the accelerator pedal depression amount is smaller than the specified value and is a second value (>the first value).

11 Claims, 10 Drawing Sheets

(51) Int. Cl.
    *B60L 7/26*          (2006.01)
    *B60W 10/08*       (2006.01)
    *B60W 10/184*    (2012.01)

(52) U.S. Cl.
    CPC ........ *B60W 10/184* (2013.01); *B60L 2240/12* (2013.01); *B60L 2240/14* (2013.01); *B60L 2240/24* (2013.01); *B60W 2540/10* (2013.01); *B60W 2540/12* (2013.01); *B60W 2720/106* (2013.01)

(56) References Cited

OTHER PUBLICATIONS

International Search Report issued in PCT/JP2019/002877; dated Mar. 12, 2019.

\* cited by examiner

[FIG. 2]
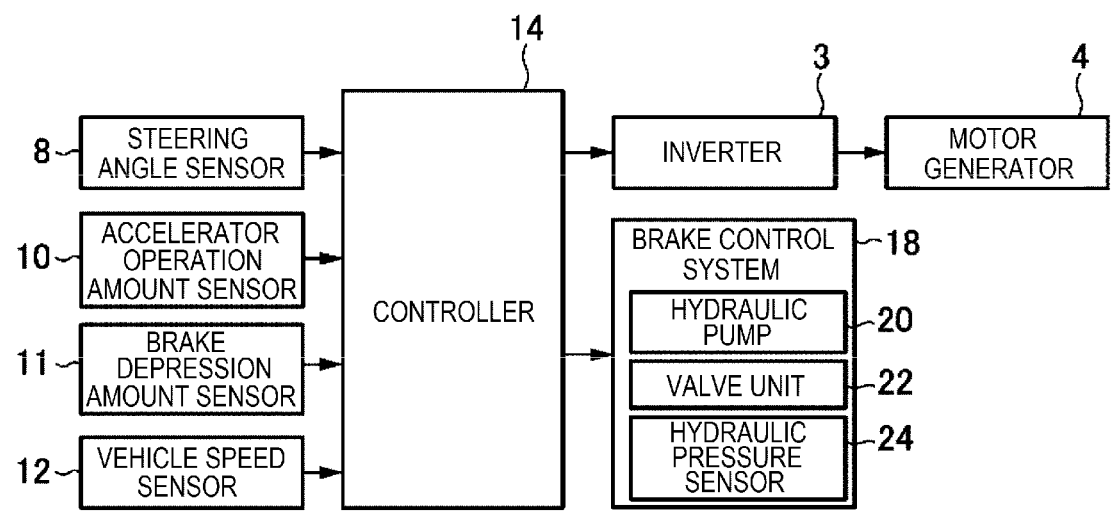

[FIG. 3]
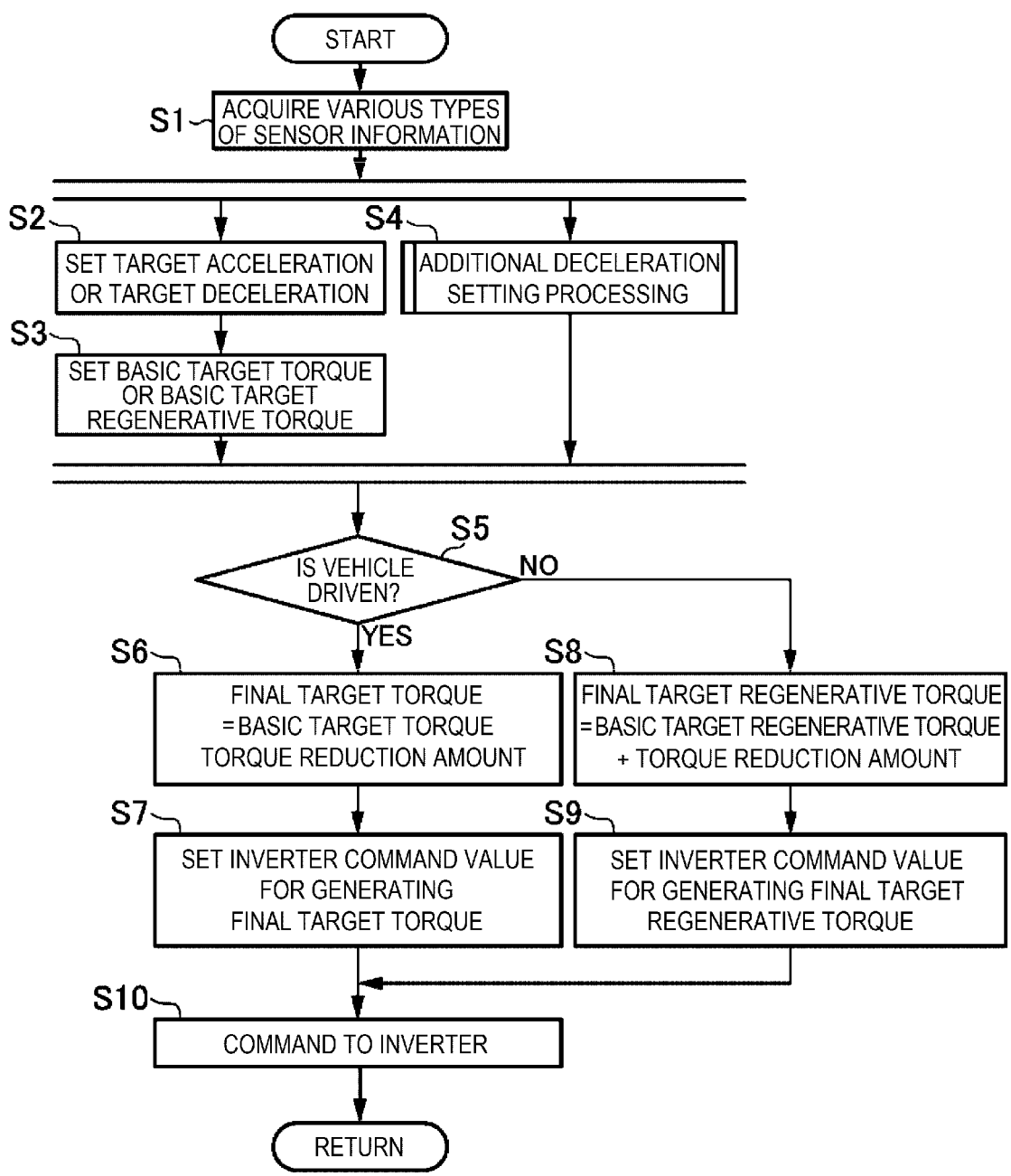

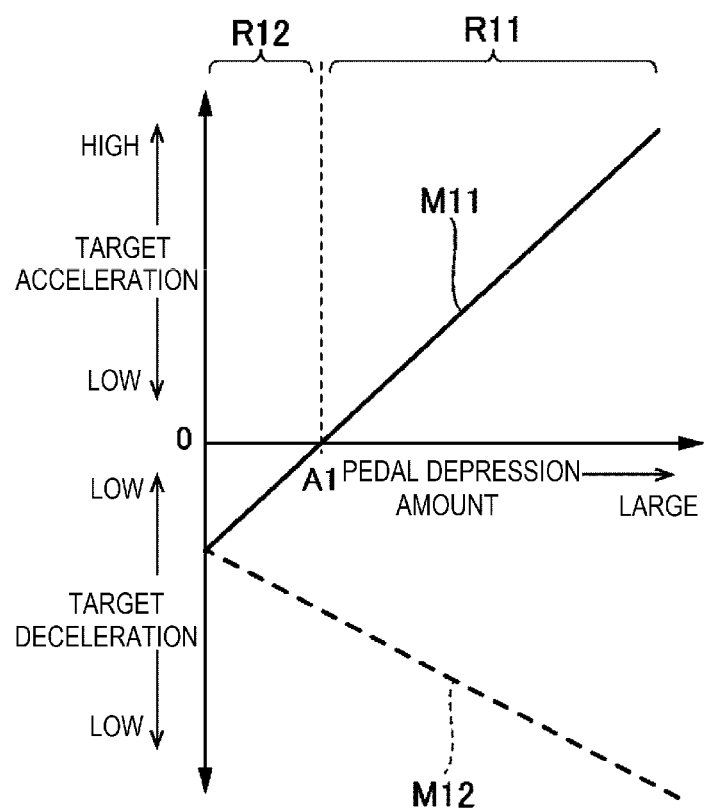
[FIG. 4]

[FIG. 5]
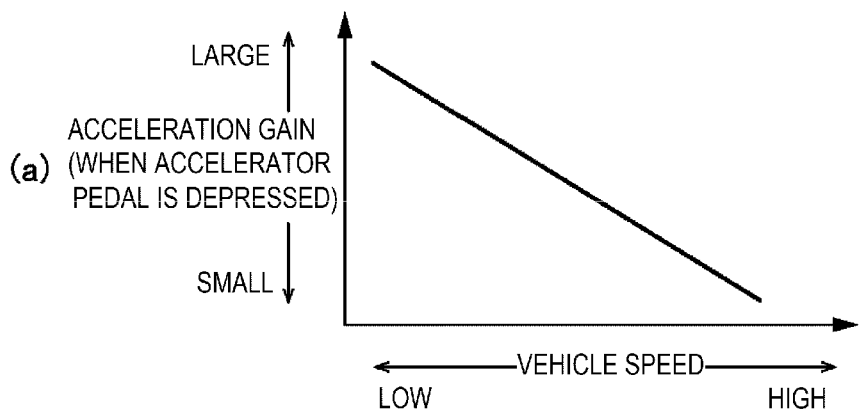
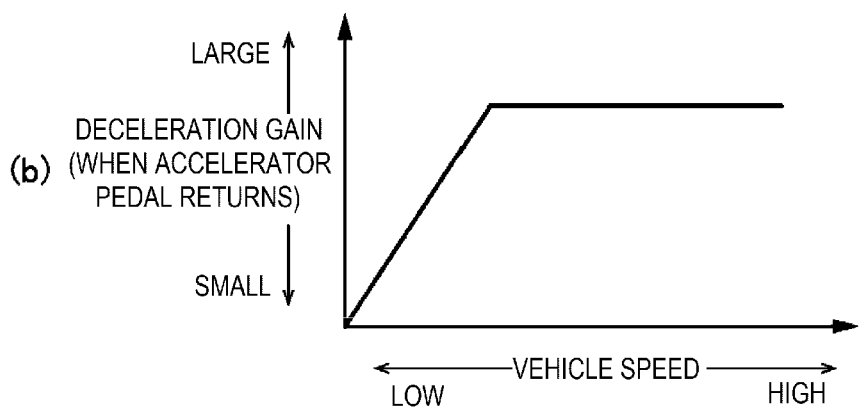
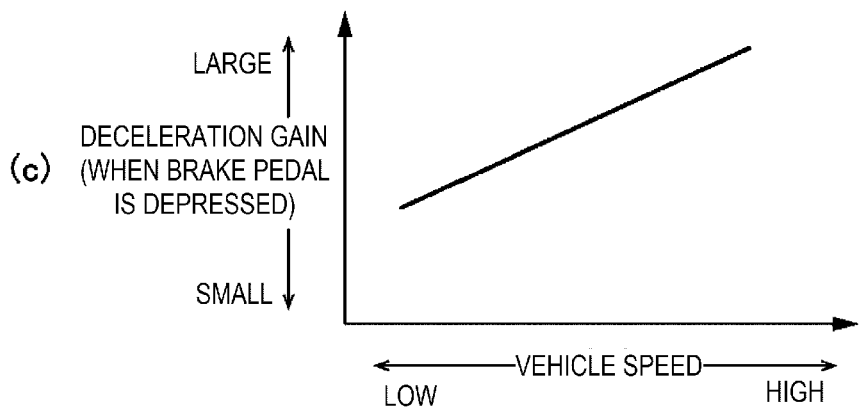

[FIG. 6]
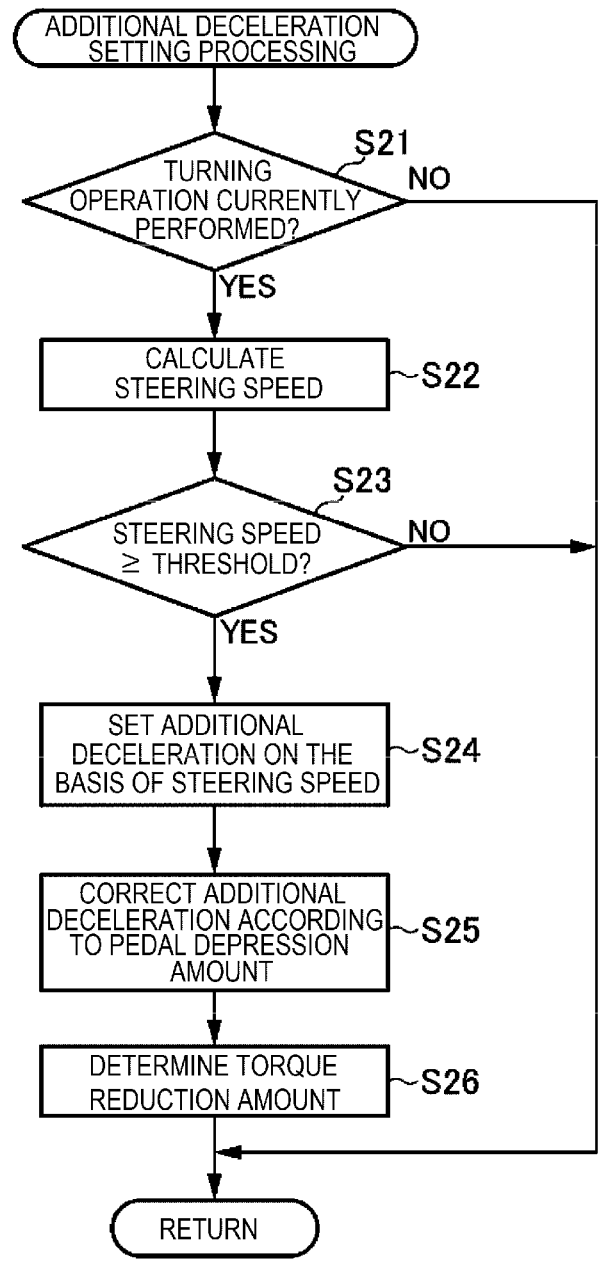

[FIG. 7]
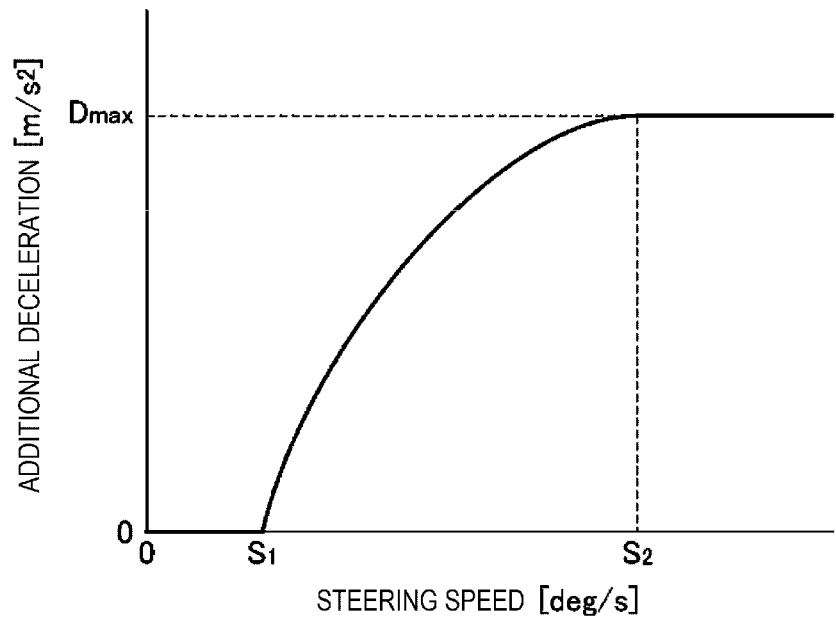
[FIG. 8]
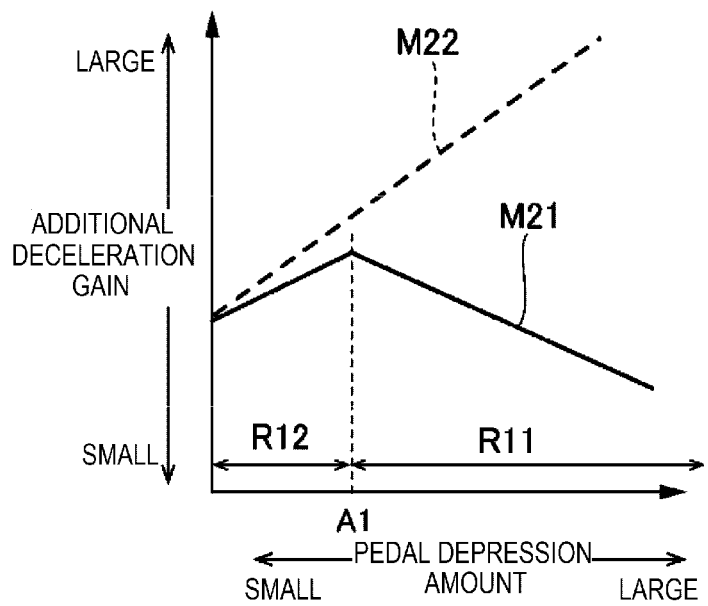

[FIG. 9]
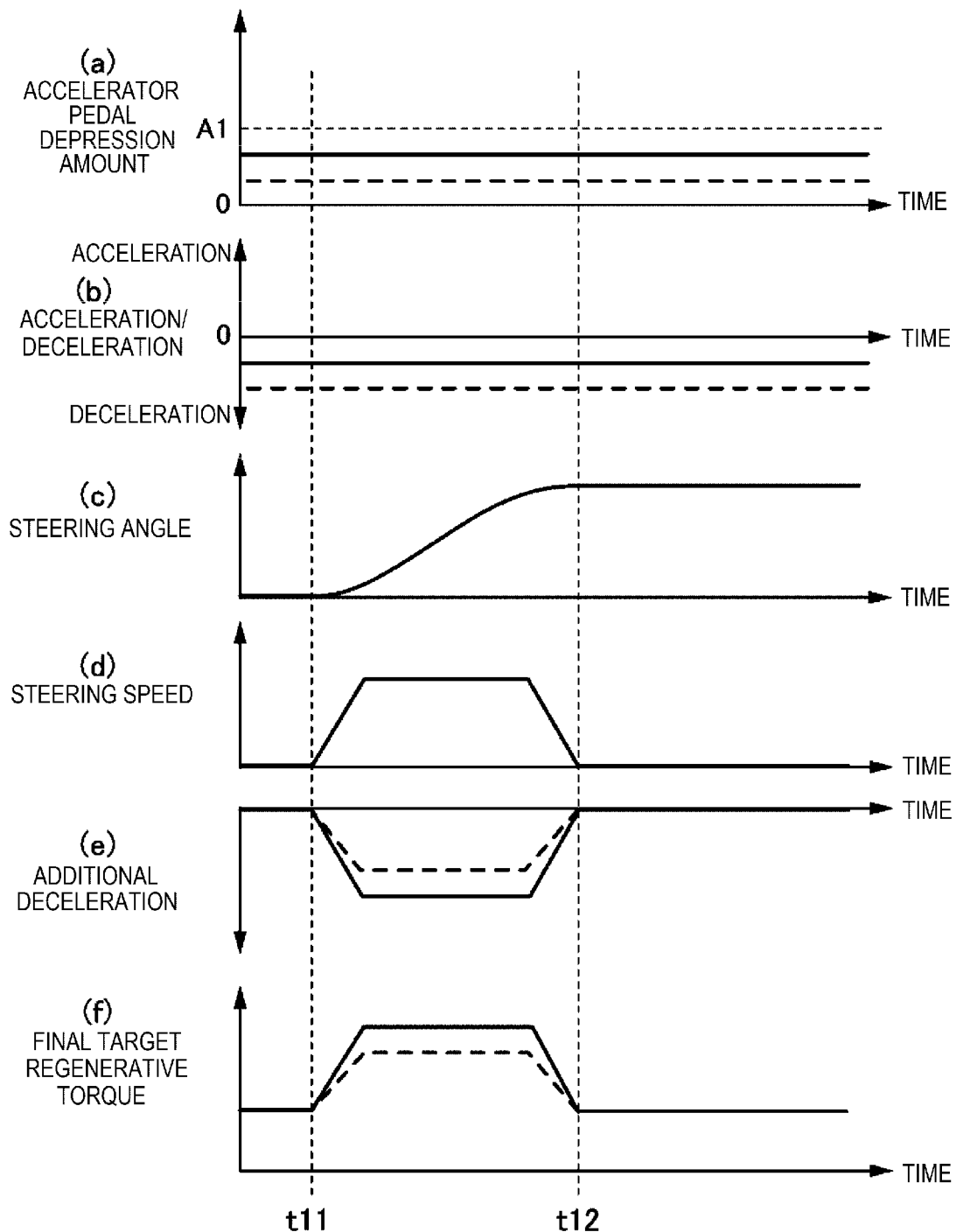

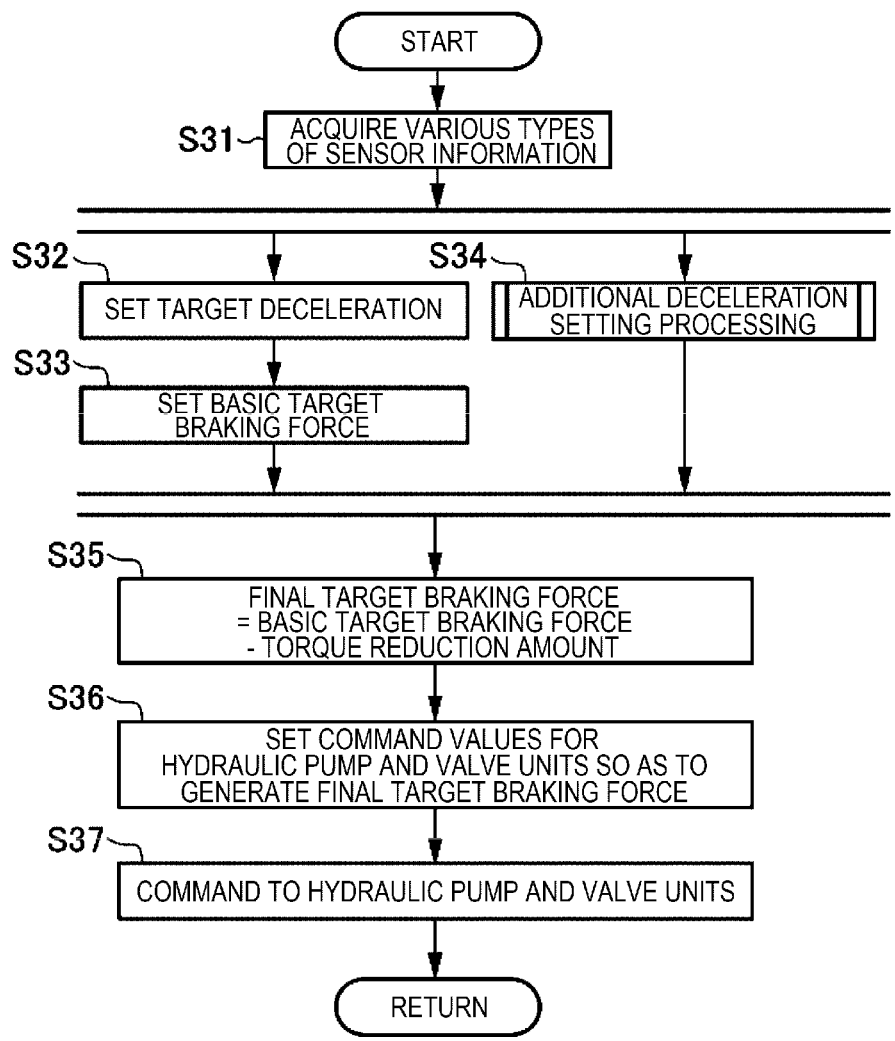
[FIG. 10]

[FIG. 11]
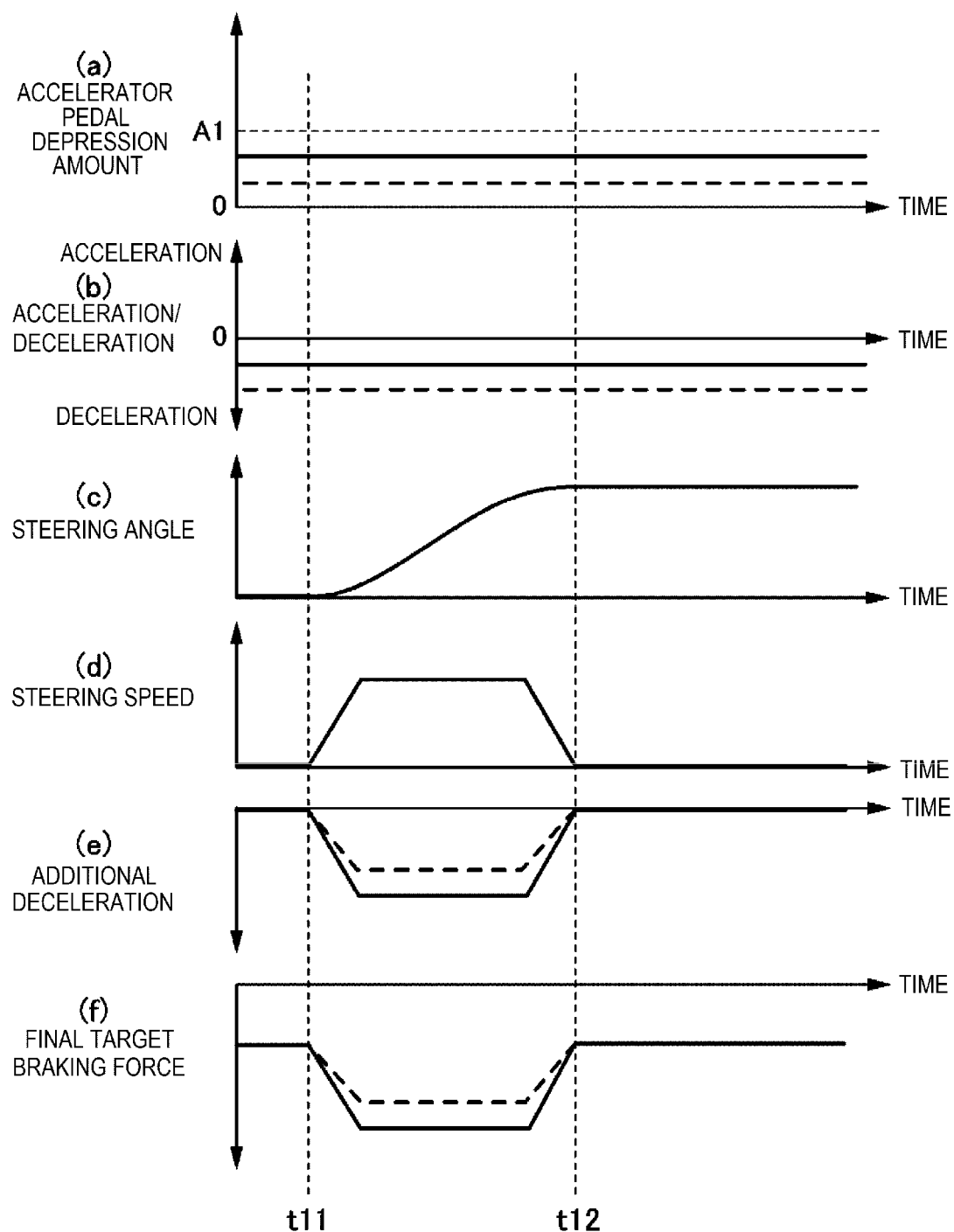

CONTROL METHOD FOR VEHICLE, VEHICLE SYSTEM, AND VEHICLE CONTROLLER

TECHNICAL FIELD

The present invention relates to a control method for a vehicle, a vehicle system, and a vehicle controller executing control to add deceleration to a vehicle in a specified situation.

BACKGROUND ART

Conventionally, a technique (for example, a sideslip prevention device) of controlling behavior of a vehicle for safety at the time when the behavior of the vehicle becomes unstable due to a slip or the like has been known. More specifically, a technique of detecting that the behavior such as understeer or oversteer occurs to the vehicle during cornering of the vehicle or the like and applying appropriate deceleration to wheels in order to prevent the understeer or the oversteer has been known.

Meanwhile, a vehicle motion controller has been known. Instead of the control to improve the safety in such a travel condition that the behavior of the vehicle becomes unstable as described above, the vehicle motion controller adjusts a load that is applied to front wheels as steering wheels by adjusting the deceleration during cornering so that a series of operations (braking, turning of a steering wheel, acceleration, returning of the steering wheel, and the like) by a driver during cornering of the vehicle in a normal travel condition becomes natural and stable.

Furthermore, a vehicle behavior controller has been proposed. The vehicle behavior controller reduces generated torque by an engine or a motor according to a yaw-rate related amount (for example, yaw acceleration) that corresponds to the steering operation by the driver, so as to promptly generate the deceleration on the vehicle at the time when the driver starts the steering operation and thereby promptly apply a sufficient amount of the load to the front wheels as the steering wheels (for example, see PTL 1). According to this controller, a friction force between each of the front wheels and a road surface is increased by promptly applying the load to the front wheels at the initiation of the steering operation, and a cornering force on each of the front wheels is increased. Accordingly, turnability of the vehicle at an initial stage of entry to a curve is improved, and responsiveness to the turning operation of the steering wheel (that is, steering stability) is improved. As a result, it is possible to realize control for a vehicle posture that meets the driver's intention. Hereinafter, such control will appropriately be referred to as "vehicle posture control".

CITATION LIST

Patent Literature

PTL 1: Japanese Patent No. 6229879

SUMMARY OF INVENTION

Technical Problem

By the way, recently, a technique that allows the acceleration and the deceleration of the vehicle by an operation of a pedal (hereinafter appropriately referred to as a "single pedal") is proposed. In this technique, the driver can stop, start, accelerate, and decelerate the vehicle and can also travel the vehicle steadily by adjusting a depression amount of the single pedal, or the like.

Here, in the conventional vehicle posture control described above, the deceleration added to the vehicle is controlled with an assumption that an accelerator pedal is operated at the time of starting and accelerating the vehicle and a brake pedal is operated at the time of decelerating and stopping the vehicle. In particular, in the vehicle posture control disclosed in PTL 1, the deceleration added to the vehicle is changed on the basis of requested deceleration that corresponds to the operation of the brake pedal. However, in the conventional vehicle posture control, the deceleration added to the vehicle cannot appropriately be controlled according to an acceleration/deceleration state of the vehicle that is changed in response to the operation of the single pedal.

The present invention has been made to solve the problem of the above-described related art and therefore has a purpose of appropriately setting deceleration on the basis of an operation of a single pedal in a control method for a vehicle, a vehicle system, and a vehicle controller that add the deceleration to the vehicle so as to control a vehicle posture when a turning operation of a steering system is performed.

Solution to Problem

In order to achieve above purpose, the present invention is a control method for a vehicle that has: a steering angle sensor that detects a steering angle of a steering system; and an accelerator sensor that detects an accelerator pedal depression amount. The control method for the vehicle includes: a step of adding deceleration that corresponds to the accelerator pedal depression amount to the vehicle when the accelerator pedal depression amount detected by the accelerator sensor is smaller than a specified value that is larger than 0; a step of determining whether a turning operation of the steering system is performed on the basis of the steering angle that is detected by the steering angle sensor; a step of adding the deceleration to the vehicle so as to control a vehicle posture when it is determined that the turning operation of the steering system is performed; and a step of setting the deceleration, which is added to the vehicle at the time when it is determined that the turning operation of the steering system is performed, to a smaller value when the accelerator pedal depression amount is smaller than the specified value and is a first value than when the accelerator pedal depression amount is smaller than the specified value and is a second value that is larger than the first value.

In the present invention that is configured just as described, when the accelerator pedal depression amount is equal to or larger than the specified value (>0), acceleration that corresponds to the accelerator pedal depression amount is added to the vehicle. Meanwhile, when the accelerator pedal depression amount is smaller than the specified value, the deceleration that corresponds to the accelerator pedal depression amount is added to the vehicle. Accordingly, this accelerator pedal can achieve both of the acceleration and the deceleration of the vehicle by an operation of the pedal and has a function as the above-described single pedal. Meanwhile, in the invention of the present application, when the turning operation of the steering system is performed, the deceleration is added to the vehicle so as to control the vehicle posture, that is, vehicle posture control is executed. In addition, in the invention of the present application, the deceleration added to the vehicle is set according to the accelerator pedal depression amount in the vehicle posture control. In this way, in the vehicle posture control, it is possible to add the appropriate deceleration that corresponds to an operation of the accelerator pedal having the function as the single pedal.

In particular, in the present invention, when the accelerator pedal depression amount is smaller than the specified value, that is, in the case where the accelerator pedal depression amount is small at a time when a driver decelerates the vehicle by an accelerator pedal operation, the deceleration added to the vehicle is reduced in the vehicle posture control. As a result, when the driver returns the accelerator pedal significantly and thus is sensitive to the change in the deceleration, it is possible to suppress the driver from receiving such a sense of discomfort that the higher deceleration (excessive deceleration) than that requested by the driver is generated due to the addition of the deceleration by the vehicle posture control.

In the present invention, preferably, in the step of setting the deceleration, when the accelerator pedal depression amount is smaller than the specified value, the deceleration that is added to the vehicle is further reduced with a reduction in the accelerator pedal depression amount.

According to the present invention that is configured as described above, it is possible to effectively suppress the driver from receiving such a sense of discomfort that the higher deceleration than that requested by the driver is generated due to the addition of the deceleration by the vehicle posture control.

In the present invention, preferably, in the step of setting the deceleration, when the accelerator pedal depression amount is equal to or larger than the specified value, the deceleration that is added to the vehicle is further reduced with an increase in the accelerator pedal depression amount.

In the present invention that is configured as described above, when the accelerator pedal depression amount is equal to or larger than the specified value, that is, when the driver accelerates the vehicle by the accelerator pedal operation, the additional deceleration by the vehicle posture control is reduced with the increase in the accelerator pedal depression amount. As a result, when the driver depresses the accelerator pedal significantly and thus is sensitive to the change in the acceleration, it is possible to suppress the driver from receiving such a sense of discomfort that the acceleration requested by the driver is not appropriately generated due to the addition of the deceleration in the vehicle posture control.

In a preferred example, the vehicle has a generator that is driven by a wheel to generate regenerative power, and a step of causing the generator to generate the regenerative power so as to add the set deceleration to the vehicle is further provided.

In a preferred example, the vehicle has a braking device that adds a braking force to a wheel, and a step of causing the braking device to add the braking force so as to add the set deceleration to the vehicle is further provided.

In another aspect, in order to achieve the above purpose, the present invention is a vehicle system that includes: a steering angle sensor that detects a steering angle of a steering system; an accelerator sensor that detects an accelerator pedal depression amount; and a processor. The processor is configured to: add deceleration that corresponds to the accelerator pedal depression amount to the vehicle when the accelerator pedal depression amount detected by the accelerator sensor is smaller than a specified value that is larger than 0; determine whether a turning operation of the steering system is performed on the basis of the steering angle that is detected by the steering angle sensor; add the deceleration to the vehicle so as to control a vehicle posture when it is determined that the turning operation of the steering system is performed; and reduce the deceleration, which is added to the vehicle at the time when it is determined that the turning operation of the steering system is performed, to be smaller when the accelerator pedal depression amount is smaller than the specified value and is a first value than when the accelerator pedal depression amount is smaller than the specified value and is a second value that is larger than the first value.

Also according to the present invention that is configured as described above, by setting the appropriate deceleration that corresponds to the operation of the accelerator pedal having the function as the single pedal in the vehicle posture control, it is possible to suppress the driver from receiving the sense of discomfort caused by the addition of the deceleration by the vehicle posture control.

In yet another aspect, in order to achieve the above purpose, the present invention is a vehicle controller that has: first deceleration addition means that adds deceleration corresponding to an accelerator pedal depression amount to a vehicle when the accelerator pedal depression amount is smaller than a specified value that is larger than 0; and second deceleration addition means that adds the deceleration to the vehicle so as to control a vehicle posture when a turning operation of a steering system is performed. In the case where the accelerator pedal depression amount is smaller than the specified value, the second deceleration addition means reduces the deceleration added to the vehicle to be smaller when the accelerator pedal depression amount is small than when the accelerator pedal depression amount is not small.

Also according to the present invention that is configured as described above, by setting the appropriate deceleration that corresponds to the operation of the accelerator pedal having the function as the single pedal in the vehicle posture control, it is possible to suppress the driver from receiving the sense of discomfort caused by the addition of the deceleration by the vehicle posture control.

Advantageous Effects of Invention

According to the present invention, in the control method for the vehicle, the vehicle system, and the vehicle controller that add the deceleration to the vehicle so as to control the vehicle posture when the turning operation of the steering system is performed, it is possible to appropriately set the deceleration on the basis of the operation of the single pedal.

BRIEF DESCRIPTION OF DRAWINGS

FIG. 2 is a block diagram illustrating an electric configuration of the vehicle controller according to the embodiment of the present invention.

FIG. 3 is a flowchart of vehicle posture control processing according to the embodiment of the present invention.

FIG. 4 is a map illustrating a relationship between a pedal depression amount and target acceleration/deceleration according to the embodiment of the present invention.

FIG. 5 includes maps, each of which defines a gain used to correct the target acceleration or the target deceleration according to the embodiment of the present invention.

FIG. 6 is a flowchart of additional deceleration setting processing according to the embodiment of the present invention.

FIG. 7 is a map illustrating a relationship between additional deceleration and a steering speed according to the embodiment of the present invention.

FIG. 8 is a map that defines a gain (an additional deceleration gain) used to correct the additional deceleration according to the embodiment of the present invention.

FIG. 9 includes time charts, each of which represents a temporal change in a parameter related to vehicle posture control in the case where the vehicle, on which the vehicle controller according to the embodiment of the present invention is mounted, turns.

FIG. 10 is a flowchart illustrating vehicle posture control processing according to a modified example of the embodiment of the present invention.

FIG. 11 includes time charts, each of which represents a temporal change in a parameter related to vehicle posture control in the case where a vehicle, on which a vehicle controller according to the modified example of the embodiment of the present invention is mounted, turns.

DESCRIPTION OF EMBODIMENTS

Figure 1:
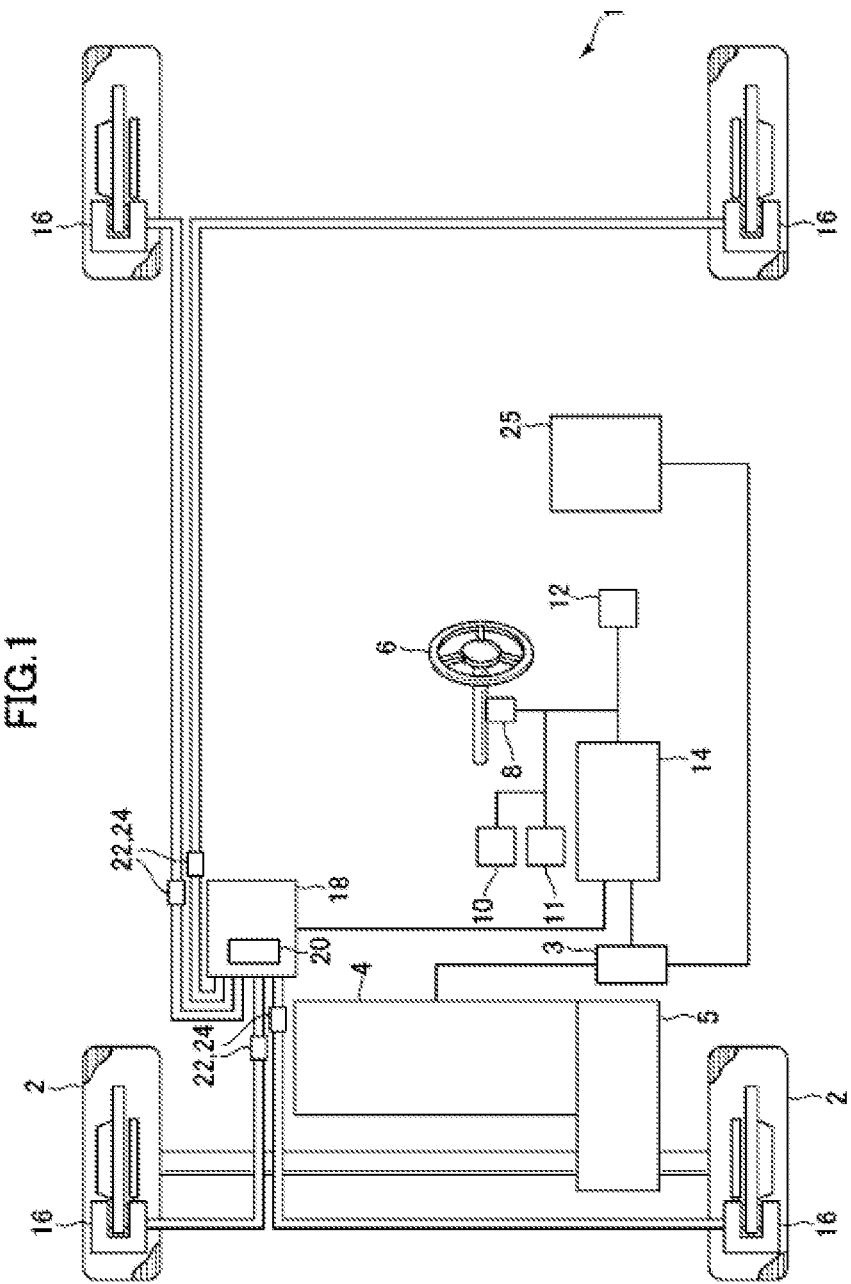
FIG. 1 is a block diagram illustrating an overall configuration of a vehicle on which a vehicle controller according to an embodiment of the present invention is mounted.

A description will hereinafter be made on a vehicle controller according to an embodiment of the present invention with reference to the accompanying drawings.

<System Configuration>

First, a description will be made on a system configuration of a vehicle, on which the vehicle controller according to the embodiment of the present invention is mounted, with reference to FIG. 1. FIG. 1 is a block diagram illustrating an overall configuration of the vehicle, on which the vehicle controller according to the embodiment of the present invention is mounted.

In FIG. 1, the vehicle, on which the vehicle controller according to this embodiment is mounted, is denoted by a reference sign 1. A motor generator 4 is mounted on the vehicle 1. The motor generator 4 has: a function of driving front wheels 2 (that is, a function as an electric motor); and a function of generating regenerative power when being driven by the front wheels 2 (that is, a function as a generator). Power is transmitted between the motor generator 4 and the front wheels 2 via a reduction gear unit 5, and the motor generator 4 is controlled by a controller 14 via an inverter 3. Furthermore, the motor generator 4 is connected to a battery 25, is supplied with electric power from the battery 25 when generating drive power, and supplies the electric power to the battery 25 and charges the battery 25 with the electric power when generating the regenerative power.

The vehicle 1 also has: a steering system (a steering wheel 6 and the like) for steering the vehicle 1; a steering angle sensor 8 that detects a rotation angle of a steering column (not illustrated) coupled to the steering wheel 6 in this steering system; an accelerator operation amount sensor (an accelerator sensor) 10 that detects a depression amount of an accelerator pedal corresponding to an operation amount of the accelerator pedal; a brake depression amount sensor 11 that detects a depression amount of a brake pedal; and a vehicle speed sensor 12 that detects a vehicle speed. Each of these sensors outputs a detection value to the controller 14. This controller 14 is configured to include a power-train control module (PCM) and the like.

The vehicle 1 further includes a brake control system 18 that supplies a brake hydraulic pressure to a wheel cylinder and a brake caliper in a brake system (a braking device) 16 provided to each of the wheels. The brake control system 18 includes: a hydraulic pump 20 that generates the brake hydraulic pressure required to generate a braking force in the brake system. 16 provided to each of the wheels; a valve unit 22 (more specifically, a solenoid valve) that is provided in a hydraulic pressure supply line to the brake system 16 for each of the wheels and controls the hydraulic pressure to be supplied from the hydraulic pump 20 to the brake system 16 for each of the wheels; and a hydraulic pressure sensor 24 that detects the hydraulic pressure supplied from the hydraulic pump 20 to the brake system 16 for each of the wheels. For example, the hydraulic pressure sensor 24 is arranged in a connected portion between each of the valve units 22 and the hydraulic pressure supply line on a downstream side thereof, detects the hydraulic pressure on the downstream side of each of the valve units 22, and outputs a detection value to the controller 14.

Next, a description will be made on an electric configuration of the vehicle controller according to the embodiment of the present invention with reference to FIG. 2. FIG. 2 is a block diagram illustrating the electric configuration of the vehicle controller according to the embodiment of the present invention.

The controller 14 (the vehicle controller) according to this embodiment controls the motor generator 4 and the brake control system 18 on the basis of detection signals that are output by various sensors for detecting an operation state of the vehicle 1 in addition to detection signals of the above-described sensors 8, 10, 11, 12. More specifically, when the vehicle 1 is driven, the controller 14 calculates target torque (drive torque) to be applied to the vehicle 1, and outputs a control signal to the inverter 3 such that the motor generator 4 generates this target torque. Meanwhile, when the vehicle 1 brakes, the controller 14 calculates target regenerative torque to be applied to the vehicle 1, and outputs a control signal to the inverter 3 such that the motor generator 4 generates this target regenerative torque. Alternatively, when the vehicle 1 brakes, instead of using such regenerative torque or in addition to use of the regenerative torque, the controller 14 may calculate a target braking force to be applied to the vehicle 1, and may output a control signal to the brake control system 18 so as to generate this target braking force. In this case, the controller 14 causes the brake system 16 to generate a desired braking force by controlling the hydraulic pump 20 and the valve units 22 in the brake control system 18.

The controller 14 (the same applies to the brake control system 18) is constructed of a computer that includes: one or more processors; various programs (including a basic control program such as an OS and an application program that is activated on the OS to implement a particular function), each of which is run interpretatively on the processor; and internal memory such as ROM and RAM for storing the programs and various types of data.

Although a detail will be described later, the controller 14 corresponds to the vehicle controller according to the present invention. The controller 14 also functions as first deceleration addition means and second deceleration addition means according to the present invention. Furthermore, a system that at least includes the controller 14, the steering angle sensor 8, and the accelerator operation amount sensor 10 corresponds to the vehicle system according to the present invention.

<Vehicle Posture Control>

Next, a description will be made on a specific control content that is executed by the vehicle controller. First, a description will be made on an overall flow of vehicle posture control processing that is executed by the vehicle controller according to the embodiment of the present invention with reference to FIG. 3. FIG. 3 is a flowchart of the vehicle posture control processing according to the embodiment of the present invention.

When an ignition of the vehicle 1 is turned on and the electric power is supplied to the vehicle controller, the vehicle posture control processing in FIG. 3 is initiated and is repeatedly executed in specified cycles (for example, 50 ms).

When the vehicle posture control processing is initiated, as illustrated in FIG. 3, in step S1, the controller 14 acquires various types of sensor information on the operation state of the vehicle 1. More specifically, the controller 14 acquires the detection signals that are output by the above-described various sensors as the information on the operation state. The detection signals include a steering angle detected by the steering angle sensor 8, the accelerator pedal depression amount detected by the accelerator operation amount sensor 10, the brake pedal depression amount detected by the brake depression amount sensor 11, the vehicle speed detected by the vehicle speed sensor 12, the hydraulic pressure detected by the hydraulic pressure sensor 24, a currently-set gear stage of a transmission in the vehicle 1, and the like.

Next, in step S2, the controller 14 sets target acceleration or target deceleration to be added to the vehicle 1 on the basis of the operation state of the vehicle 1 that is acquired in step S1. More specifically, the controller 14 sets the target acceleration or the target deceleration on the basis of the accelerator pedal depression amount, the brake pedal depression amount, the vehicle speed, and the like.

Here, a description will be made on a specific setting method of the target acceleration and the target deceleration according to the embodiment of the present invention with reference to FIG. 4 and FIG. 5. FIG. 4 is a map illustrating a relationship between the pedal depression amount and the target acceleration/deceleration according to the embodiment of the present invention. Each of FIGS. 5(a) to (c) is a map that defines a gain used to correct the target acceleration or the target deceleration acquired from the map in FIG. 4 according to the vehicle speed in the embodiment of the present invention.

In FIG. 4, a horizontal axis represents the pedal depression amount (both of the accelerator pedal depression amount and the brake pedal depression amount), and a vertical axis represents the target acceleration and the target deceleration. A reference sign M11 denotes a map illustrating a relationship between the accelerator pedal depression amount and each of the target acceleration and the target deceleration. This map M11 is defined that the target acceleration is set in a region R11 where the accelerator pedal depression amount is equal to or larger than a specified value A1 (>0) and that the target deceleration is set in a region R12 where the accelerator pedal depression amount is smaller than the specified value A1. By applying such a map M11, the accelerator pedal in this embodiment can achieve both of acceleration and deceleration of the vehicle 1 with an operation of such a pedal only, and thus has a function as the above-described single pedal. More specifically, the map M11 is defined that, in the region R11 where the accelerator pedal depression amount is equal to or larger than the specified value A1, the target acceleration is increased with an increase in the accelerator pedal depression amount and, in the region R12 where the accelerator pedal depression amount is smaller than the specified value A1, the target deceleration (an absolute value) is increased with a reduction in the accelerator pedal depression amount. Meanwhile, a reference sign M12 denotes a map illustrating a relationship between the brake pedal depression amount and the target deceleration. This map M12 is defined that the target deceleration (the absolute value) is increased with an increase in the brake pedal depression amount.

Next, each of FIGS. 5(a) to (c) is a map that illustrates a relationship between the vehicle speed and an acceleration gain or a deceleration gain used to correct the target acceleration or the target deceleration, respectively. FIG. 5(a) is a map that illustrates a relationship between the vehicle speed (a horizontal axis) and the acceleration gain (a vertical axis) applied when the accelerator pedal is depressed. The map illustrated in FIG. 5(a) is defined that the acceleration gain is increased with a reduction in the vehicle speed. According to this map, when the vehicle speed is low, a correction is made to increase the target acceleration with the acceleration gain. This is because, when the vehicle speed is low, a degree of an acceleration request at the time when a driver depresses the accelerator pedal is high.

FIG. 5(b) is a map that illustrates a relationship between the vehicle speed (a horizontal axis) and the deceleration gain (a vertical axis) applied when the accelerator pedal returns from being depressed. The map illustrated in FIG. 5(b) is defined that, when the vehicle speed is lower than a specified value, the deceleration gain is reduced with the reduction in the vehicle speed and that, when the vehicle speed is equal to or higher than the specified value, the deceleration gain remains constant regardless of the vehicle speed. According to this map, when the vehicle speed is low, a correction is made to reduce the target deceleration (the absolute value) by the deceleration gain. In this way, when the accelerator pedal returns from being depressed and the vehicle speed is reduced toward 0, the deceleration is gradually reduced. As a result, the vehicle 1 stops smoothly.

FIG. 5(c) is a map that illustrates a relationship between the vehicle speed (a horizontal axis) and the deceleration gain (a vertical axis) applied when the brake pedal is depressed. The map illustrated in FIG. 5(c) is defined that the deceleration gain is reduced with the reduction in the vehicle speed. According to this map, when the vehicle speed is low, a correction is made to reduce the target deceleration (the absolute value) by the deceleration gain. This is because, when depressing the brake pedal at the low vehicle speed, the driver does not make an excessive deceleration request.

In step S2 of the vehicle posture control processing in FIG. 3, the controller 14 determines the target acceleration or the target deceleration according to the accelerator pedal depression amount or the brake pedal depression amount by using the map M11 or the map M12 illustrated in FIG. 4, and then corrects the thus-determined target acceleration or target deceleration according to the vehicle speed by using respective one of the maps in FIGS. 5(a) to (c). For example, the controller 14 corrects the target acceleration or the target deceleration by multiplying the target acceleration or the target deceleration by a value that corresponds to the acceleration gain or the deceleration gain acquired from respective one of the maps in FIGS. 5(a) to (c).

The example in which the target acceleration and the target deceleration are corrected according to the vehicle speed has been described above. However, the target acceleration and the target deceleration may be corrected according to a depression speed or a return speed of the accelerator pedal and the brake pedal, respectively, instead of the vehicle speed. For example, the target acceleration may be corrected to be increased with an increase in the depression speed of the accelerator pedal, or the target deceleration (the absolute value) may be corrected to be increased with an increase in the return speed of the accelerator pedal.

Referring back to FIG. 3, the processing in step S3 and onward will be described. In step S3, in the case where the target acceleration is set in step S2, the controller 14 sets basic target torque of the motor generator 4 to generate this target acceleration. Meanwhile, in the case where the target deceleration is set in step S2, the controller 14 sets basic target regenerative torque of the motor generator 4 to generate this target deceleration.

In parallel with the processing in steps S2 and S3, in step S4, the controller 14 executes additional deceleration setting processing and determines a torque reduction amount on the basis of the steering speed of the steering system. The torque reduction amount is required to control the vehicle posture by generating the deceleration on the vehicle 1. A detailed description on this additional deceleration setting processing will be made later.

Next, in step S5, the controller 14 determines whether the vehicle 1 is driven, in other words, whether the vehicle 1 does not brake. In one example, in the case where the basic target torque is set in step S3 (that is, in the case where the target acceleration is set in step S2), the controller 14 determines that the vehicle is driven. Meanwhile, in the case where the basic target regenerative torque is set in step S3 (that is, in the case where the target deceleration is set in step S2), the controller 14 determines that the vehicle 1 is not driven. In another example, the controller 14 makes the determination on the basis of the detection signal of the accelerator operation amount sensor 10 or the brake depression amount sensor 11. In this example, in the case where the accelerator pedal depression amount that is detected by the accelerator operation amount sensor 10 is equal to or larger than the specified value A1, the controller 14 determines that the vehicle 1 is driven. In the case where the accelerator pedal depression amount that is detected by the accelerator operation amount sensor 10 is smaller than the specified value A1, the controller 14 determines that the vehicle 1 is not driven. Alternatively, in the case where the brake pedal depression amount that is detected by the brake depression amount sensor 11 is larger than 0, that is, in the case where the depression of the brake pedal is not detected by the brake depression amount sensor 11, the controller 14 determines that the vehicle 1 is not driven.

If it is determined in step S5 that the vehicle 1 is driven (step S5: Yes), in step S6, the controller 14 determines final target torque on the basis of the basic target torque set in step S3 and the torque reduction amount set in step S4. More specifically, the controller 14 sets a value that is acquired by subtracting the torque reduction amount from the basic target torque as the final target torque. That is, the controller 14 reduces the drive torque that is applied to the vehicle 1. In the case where the torque reduction amount is not set (that is, in the case where the torque reduction amount is 0) in step S4, the controller 14 adopts the basic target torque as is as the final target torque.

Next, in step S7, the controller 14 sets a command value for the inverter 3 (an inverter command value) so as to generate the final target torque determined in step S6. That is, the controller 14 sets the inverter command value (a control signal) that causes the motor generator 4 to generate the final target torque. Then, in step S10, the controller 14 outputs the inverter command value, which is set in step S7, to the inverter 3. After this step S10, the controller 14 terminates the vehicle posture control processing.

Meanwhile, if it is determined in step S5 that the vehicle 1 is not driven (step S5: No), that is, if the vehicle 1 brakes, in step S8, the controller 14 determines final target regenerative torque on the basis of the basic target regenerative torque determined in step S3 and the torque reduction amount determined in step S4. More specifically, the controller 14 sets a value that is acquired by adding the torque reduction amount to the basic target regenerative torque as the final target regenerative torque (in principle, the basic target regenerative torque and the torque reduction amount are expressed by positive values). That is, the controller 14 increases the regenerative torque (braking torque) that is applied to the vehicle 1. In the case where the torque reduction amount is not determined (that is, in the case where the torque reduction amount is 0) in step S4, the controller 14 adopts the basic target regenerative torque as is as the final target regenerative torque.

Next, in step S9, the controller 14 sets a command value for the inverter 3 (an inverter command value) so as to generate the final target regenerative torque determined in step S8. That is, the controller 14 sets the inverter command value (a control signal) that causes the motor generator 4 to generate the final target regenerative torque. Then, in step S10, the controller 14 outputs the inverter command value, which is set in step S9, to the inverter 3. After this step S10, the controller 14 terminates the vehicle posture control processing.

Next, a description will be made on the additional deceleration setting processing according to the embodiment of the present invention with reference to FIG. 6 to FIG. 8.

FIG. 6 is a flowchart of the additional deceleration setting processing according to the embodiment of the present invention. FIG. 7 is a map illustrating a relationship between additional deceleration and the steering speed according to the embodiment of the present invention. FIG. 8 is a map that defines a gain (an additional deceleration gain) used to correct the additional deceleration acquired from the map in FIG. 7 according to the pedal depression amount in the embodiment of the present invention.

When the additional deceleration setting processing in FIG. 6 is initiated, in step S21, the controller 14 determines whether a turning operation of the steering wheel 6 is currently performed (that is, whether the steering angle (an absolute value) is currently increased).

As a result, if the turning operation is currently performed (step S21: Yes), the processing proceeds to step S22. Then, the controller 14 calculates the steering speed on the basis of the steering angle that is acquired from the steering angle sensor 8 in step S1 of the vehicle posture control processing illustrated in FIG. 3.

Next, in step S23, the controller 14 determines whether the steering speed is equal to or higher than a specified threshold $S_1$. As a result, if the steering speed is equal to or higher than the threshold $S_1$ (step S23: Yes), the processing proceeds step S24, and the controller 14 sets the additional deceleration on the basis of the steering speed. This additional deceleration is deceleration that should be added to the vehicle according to a steering operation in order to control the vehicle posture along with the driver's intention.

More specifically, the controller 14 sets the additional deceleration that corresponds to the steering speed calculated in step S22 on the basis of the relationship between the additional deceleration and the steering speed illustrated in the map in FIG. 7. A horizontal axis in FIG. 7 represents the steering speed, and a vertical axis therein represents the additional deceleration. As illustrated in FIG. 7, in the case where the steering speed is lower than the threshold $S_1$, the corresponding additional deceleration is 0. That is, in the case where the steering speed is lower than the threshold $S_1$, the controller 14 does not execute the control for adding the deceleration to the vehicle 1 on the basis of the steering operation.

On the other hand, in the case where the steering speed is equal to or higher than the threshold S1, the additional deceleration that corresponds to this steering speed gradually approximates a specified upper limit value $D_{max}$ along with an increase in the steering speed. That is, as the steering speed is increased, the additional deceleration is increased, and an increase rate of an increase amount thereof is reduced. This upper limit value $D_{max}$ is set to the deceleration of such a magnitude that the driver does not consider that control intervention occurs even when the deceleration is added to the vehicle 1 according to the steering operation (for example, 0.5 m/s² 0.05 G). Furthermore, in the case where the steering speed is equal to or higher than a threshold $S_2$ that is higher than the threshold $S_1$, the additional deceleration is maintained at the upper limit value $D_{max}$.

Next, in step S25, the controller 14 corrects the additional deceleration set in step S24 by the additional deceleration gain that corresponds to the pedal depression amount. More specifically, the controller 14 determines the additional deceleration gain that corresponds to the current accelerator pedal depression amount or the current brake pedal depression amount detected by the accelerator operation amount sensor 10 or the brake depression amount sensor 11 on the basis of the map illustrated in FIG. 8, and then corrects the additional deceleration by this additional deceleration gain. For example, the controller 14 corrects the additional deceleration by multiplying the additional deceleration by a value that corresponds to the additional deceleration gain.

In FIG. 8, a horizontal axis represents the pedal depression amount (both of the accelerator pedal depression amount and the brake pedal depression amount), and a vertical axis represents the additional deceleration gain. Similar to FIG. 4, FIG. 8 illustrates the specified value A1 of the accelerator pedal depression amount, the region R11 where the accelerator pedal depression amount is equal to or larger than this specified value A1, and the region R12 where the accelerator pedal depression amount is smaller than this specified value A1. As described above, the target acceleration is set in the region R11 where the accelerator pedal depression amount is equal to or larger than the specified value A1, and the target deceleration is set in the region R12 where the accelerator pedal depression amount is smaller than the specified value A1.

In FIG. 8, a reference sign M21 denotes a map illustrating a relationship between the accelerator pedal depression amount and the additional deceleration gain. This map M21 is defined that, in the region R11 where the accelerator pedal depression amount is equal to or larger than the specified value A1, the additional deceleration gain is reduced with the increase in the accelerator pedal depression amount. Accordingly, in the region R11, a correction is made such that the additional deceleration (an absolute value) is reduced with the increase in the accelerator pedal depression amount. Meanwhile, the map M21 is defined that, in the region R12 where the accelerator pedal depression amount is smaller than the specified value A1, the additional deceleration gain is reduced with the reduction in the accelerator pedal depression amount. Accordingly, in the region R12, a correction is made such that the additional deceleration (the absolute value) is reduced with the reduction in the accelerator pedal depression amount.

A reference sign M22 denotes a map illustrating a relationship between the brake pedal depression amount and the additional deceleration gain. This map M22 is defined that the additional deceleration gain is increased with the increase in the brake pedal depression amount. Accordingly, a correction is made such that the additional deceleration (the absolute value) is increased with the increase in the brake pedal depression amount.

Next, in step S26, the controller 14 determines the torque reduction amount on the basis of the additional deceleration that is corrected in step S25. More specifically, the controller 14 determines a torque amount that is required to generate the additional deceleration by a reduction in the drive torque from the motor generator 4 or an increase in the regenerative torque from the motor generator 4. After step S26, the controller 14 terminates the additional deceleration setting processing, and the processing returns to a main routine.

Meanwhile, in step S21, if the turning operation of the steering wheel 6 is not currently performed (step S21: No), or in step S23, if the steering speed is lower than the threshold $S_1$ (step S23: No), the controller 14 terminates the additional deceleration setting processing without setting the additional deceleration, and the processing returns to the main routine. In this case, the torque reduction amount becomes 0.

In the above step S25, the additional deceleration, which is set on the basis of the steering speed, is corrected by the additional deceleration gain corresponding to the pedal depression amount. In another example, the additional deceleration may be set on the basis of the steering speed and the pedal depression amount without making the correction using the additional deceleration gain. For example, a map defining the additional deceleration that should be set with respect to the steering speed and the pedal depression amount may be prepared. Then, by using such a map, the additional deceleration that corresponds to the current steering speed and the current pedal depression amount may be set.

Next, a description will be made on operation of the vehicle controller according to the embodiment of the present invention with reference to FIG. 9. FIG. 9 includes time charts, each of which represents a temporal change in one of various parameters related to the vehicle posture control at the time when the vehicle 1, on which the vehicle controller according to the embodiment of the present invention is mounted, turns.

In FIG. 9, a chart (a) represents the accelerator pedal depression amount, a chart (b) represents the acceleration and the deceleration, a chart (c) represents the steering angle, a chart (d) represents the steering speed, a chart (e) represents the additional deceleration, and a chart (f) represents the final target regenerative torque.

A description will herein be made on the changes in the various parameters related to the vehicle posture control by using two examples that are a first example and a second example. More specifically, in each of FIGS. 9(*a*), (*b*), (*e*), (*f*), a solid line represents the change in the parameter according to the first example, and a broken line represents the change in the parameter according to the second example. As illustrated in FIG. 9(*a*), it is assumed that the accelerator pedal depression amount is smaller than the specified value A1 in both of the first example and the second example and that the accelerator pedal depression amount is smaller in the second example than in the first example. Thus, as illustrated in FIG. 9(*b*), the vehicle 1 is decelerated in both of the first example and the second example, and the deceleration (an absolute value) is higher in the second example than in the first example. In addition, as illustrated in FIG. 9(f), the final target regenerative torque is applied such that the motor generator 4 generates the regenerative power so as to decelerate the vehicle 1.

In a situation as described above, as illustrated in FIG. 9(c), the turning operation of the steering wheel 6 is performed from time t11. In this case, in a period from the time t11 to time t12, as illustrated in FIG. 9(d), the steering speed becomes equal to or higher than the threshold $S_1$, and, as illustrated in FIG. 9(e), the additional deceleration is set on the basis of this steering speed. More specifically, the steering speed is the same in the first example and the second example. However, the additional deceleration (the absolute value) is higher in the second example than in the first example. This is because, in the second example, the additional deceleration gain having a relatively small value is set due to the smaller accelerator pedal depression amount than that in the first example (see FIG. 8) and the additional deceleration (the absolute value) is corrected to be reduced by this additional deceleration gain. As illustrated in FIG. 9(f), the final target regenerative torque is set according to such additional deceleration in each of the first example and the second example. More specifically, the final target regenerative torque is lower in the second example than in the first example. When the motor generator 4 generates such final target regenerative torque, according to the second example, the deceleration (the absolute value) that is added in the vehicle posture control becomes lower than that in the first example. As a result, when the driver returns the accelerator pedal significantly and thus is sensitive to the change in the deceleration, it is possible to suppress the driver from receiving such a sense of discomfort that the higher deceleration than that requested by the driver is generated due to the addition of the deceleration in the vehicle posture control.

<Operational Effects>

Next, a description will be made on operational effects of the vehicle controller according to the embodiment of the present invention.

According to this embodiment, the controller 14 sets the additional deceleration that is applied in the vehicle posture control according to the accelerator pedal depression amount. In this way, in the vehicle posture control, it is possible to set the appropriate additional deceleration that corresponds to the operation of the accelerator pedal having the function as the single pedal.

In particular, according to this embodiment, when the accelerator pedal depression amount is smaller than the specified value A1, that is, when the driver decelerates the vehicle 1 by the accelerator pedal operation, the controller 14 reduces the additional deceleration by the vehicle posture control with the reduction in the accelerator pedal depression amount. As a result, when the driver returns the accelerator pedal significantly and thus is sensitive to the change in the deceleration, it is possible to suppress the driver from receiving such a sense of discomfort that the higher deceleration (excessive deceleration) than that requested by the driver is generated due to the addition of the deceleration by the vehicle posture control.

In addition, according to this embodiment, when the accelerator pedal depression amount is equal to or larger than the specified value A1, that is, when the driver accelerates the vehicle 1 by the accelerator pedal operation, the controller 14 reduces the additional deceleration by the vehicle posture control with the increase in the accelerator pedal depression amount. As a result, when the driver depresses the accelerator pedal significantly and thus is sensitive to the change in the acceleration, it is possible to suppress the driver from receiving such a sense of discomfort that the acceleration requested by the driver is not appropriately generated due to the addition of the deceleration in the vehicle posture control.

MODIFIED EXAMPLES

Next, a description will be made on modified examples of this embodiment.

First Modified Example

In the above embodiment, when the vehicle posture control is executed during braking of the vehicle 1, the motor generator 4 generates the regenerative power such that the set additional deceleration is generated on the vehicle 1 (see FIG. 3). In another example, when the vehicle posture control is executed during braking of the vehicle 1, the brake system 16 may add the braking force, so as to generate the set additional deceleration on the vehicle 1.

FIG. 10 is a flowchart of vehicle posture control processing according to the modified example of the embodiment of the present invention. The vehicle posture control processing illustrated in FIG. 10 relates to vehicle posture control that is executed during braking of the vehicle 1 (the vehicle posture control executed during driving of the vehicle 1 is the same as that in FIG. 3). Hereinafter, a description on the same processing as that in the vehicle posture control processing illustrated in FIG. 3 will appropriately be omitted. That is, the processing and the control that will not particularly be described are the same as those in the above embodiment.

First, in step S31, the controller 14 acquires various types of the sensor information on the operation state of the vehicle 1. In particular, the controller 14 acquires the steering angle detected by the steering angle sensor 8, the accelerator pedal depression amount detected by the accelerator operation amount sensor 10, the brake pedal depression amount detected by the brake depression amount sensor 11, the vehicle speed detected by the vehicle speed sensor 12, and the like.

Next, in step S32, the controller 14 sets the target deceleration to be added to the vehicle 1 on the basis of the operation state of the vehicle 1 that is acquired in step S31. More specifically, the controller 14 sets the target deceleration on the basis of the accelerator pedal depression amount, the brake pedal depression amount, the vehicle speed, and the like. More specifically, the controller 14 determines the target deceleration according to the accelerator pedal depression amount (the accelerator pedal depression amount has the specified value A1 as a precondition) or the brake pedal depression amount by using the map M11 or the map M12 illustrated in FIG. 4, and then corrects the thus-determined target deceleration according to the vehicle speed by using respective one of the maps illustrated in FIGS. 5(b) and (c).

Next, in step S33, the controller 14 sets a basic target braking force by the brake system 16 so as to generate the target deceleration set in step S32.

In parallel with the processing in steps S32 and S33, in step S34, the controller 14 executes the additional deceleration setting processing (see FIG. 6) and determines the torque reduction amount, which is required to control the vehicle posture, by generating the deceleration on the vehicle 1 on the basis of the steering speed of the steering system.

Next, in step S35, the controller 14 determines a final target braking force on the basis of the basic target braking force determined in step S33 and the torque reduction amount determined in step S34. More specifically, the controller 14 sets a value that is acquired by subtracting the torque reduction amount (the positive value) from the basic target braking force (a negative value) as the final target braking force (the negative value). That is, the controller 14 increases the braking force that is applied to the vehicle 1. In the case where the torque reduction amount is not determined (that is, in the case where the torque reduction amount is 0) in step S34, the controller 14 adopts the basic target braking force as is as the final target braking force.

Next, in step S36, the controller 14 sets command values for the hydraulic pump 20 and the valve units 22 of the brake control system 18 so as to generate the final target braking force determined in step S35. That is, the controller 14 sets the command values (control signals) for the hydraulic pump 20 and the valve units 22 that cause the brake system 16 to generate the final target braking force. Then, in step S37, the controller 14 outputs the command values, which are set in step S36, to the hydraulic pump 20 and the valve units 22. After this step S37, the controller 14 terminates the vehicle posture control processing.

Next, a description will be made on operation of the vehicle controller according to the modified example of the embodiment of the present invention with reference to FIG. 11. FIG. 11 includes time charts, each of which represents a temporal change in one of the various parameters related to the vehicle posture control at the time when the vehicle 1, on which the vehicle controller according to the modified example of the embodiment of the present invention is mounted, turns.

In FIG. 11, a chart (a) represents the accelerator pedal depression amount, a chart (b) represents the acceleration and the deceleration, a chart (c) represents the steering angle, a chart (d) represents the steering speed, a chart (e) represents the additional deceleration, and a chart (f) represents the final target braking force. In FIG. 11, the charts (a) to (e) are the same as those in FIG. 9, and only the chart (f) differs from that in FIG. 9. More specifically, the chart (f) in FIG. 11 represents the final target braking force that is set according to the additional deceleration of the chart (e) in FIG. 11. In the chart (f) in FIG. 9, the final target regenerative torque has the positive value. Meanwhile, in the chart (f) in FIG. 11, the final target braking force has the negative value. The chart (f) in FIG. 11 corresponds to a chart that is acquired by reversing the chart (f) in FIG. 9.

Also according to the modified example that has been described so far, by setting the appropriate additional deceleration that corresponds to the operation of the accelerator pedal having the function as the single pedal in the vehicle posture control, it is possible to suppress the driver from receiving the sense of discomfort caused by the addition of the deceleration by the vehicle posture control.

Second Modified Example

In the above embodiment, in the region R12 where the accelerator pedal depression amount is smaller than the specified value A1, the additional deceleration gain is reduced with the reduction in the accelerator pedal depression amount (see FIG. 8). However, the definition of the additional deceleration gain is not limited to that just as described. In another example, in the case where the accelerator pedal depression amount is equal to or larger than the specified value in the region R12 of the accelerator pedal depression amount, the additional deceleration gain may be reduced with the reduction in the accelerator pedal depression amount. Meanwhile, in the case where the accelerator pedal depression amount is smaller than the specified value, the additional deceleration gain may be set to a constant value (a value that is equal to or smaller than the additional deceleration gain at the time when the accelerator pedal depression amount is equal to or larger than the specified value) regardless of the accelerator pedal depression amount. In yet another example, in the region R12 of the accelerator pedal depression amount, both in the case where the accelerator pedal depression amount is smaller than the specified value and in the case where the accelerator pedal depression amount is equal to or larger than the specified value, the additional deceleration gain is set to the constant value regardless of the accelerator pedal depression amount. However, in the case where the accelerator pedal depression amount is smaller than the specified value, the additional deceleration gain may be reduced to be smaller than that in the case where the accelerator pedal depression amount is equal to or larger than the specified value. That is, in the region R12, in the case where the accelerator pedal depression amount is smaller than the specified value, the additional deceleration gain may be set to a first specified value, and in the case where the accelerator pedal depression amount is equal to or larger than the specified value, the additional deceleration gain may be set to a second specified value that is larger than the first specified value.

Third Modified Example

In the above embodiment, the example in which the present invention is applied to the vehicle 1 (corresponding to an EV vehicle) that is driven by the motor generator 4 has been described. In another example, the present invention can also be applied to a general vehicle that is driven by an engine. In this example, the vehicle posture only needs to be controlled by reducing engine-generated torque and thereby adding the deceleration to the vehicle 1. In the case where the engine is a gasoline engine, the engine-generated torque only needs to be reduced by delaying (retarding) ignition timing of an ignition plug. In the case where the engine is a diesel engine, the engine-generated torque only needs to be reduced by reducing a fuel injection amount. In yet another example, the present invention can also be applied to a vehicle (an HV vehicle) that is driven by the engine and the motor generator.

Fourth Modified Example

In the above embodiment, the description has been made that the rotation angle of the steering column, which is coupled to the steering wheel 6, is used as the steering angle. However, instead of the rotation angle of the steering column or in addition to the rotation angle of the steering column, any of various state amounts (a rotation angle of a motor generating assist torque, displacement of a rack in a rack and pinion, and the like) in the steering system may be used as the steering angle.

REFERENCE SIGNS LIST

1: vehicle
2: front wheel
3: inverter
4: motor generator
6: steering wheel

8: steering angle sensor
10: accelerator operation amount sensor (accelerator sensor)
11: brake depression amount sensor
12: vehicle speed sensor
14: controller
16: brake system
18: brake control system
25: battery

The invention claimed is:

1. A control method for a vehicle that has: a steering angle sensor that detects a steering angle of a steering system; and an accelerator sensor that detects an accelerator pedal depression amount, the control method for the vehicle comprising:
a step of adding deceleration that corresponds to the accelerator pedal depression amount to the vehicle when said accelerator pedal depression amount detected by the accelerator sensor is smaller than a specified value that is larger than 0;
a step of determining whether a turning operation of the steering system is performed on the basis of the steering angle that is detected by the steering angle sensor;
a step of adding the deceleration to the vehicle so as to control a vehicle posture when it is determined that the turning operation of the steering system is performed; and
a step of setting the deceleration, which is added to the vehicle at the time when it is determined that the turning operation of the steering system is performed, to a smaller value when the accelerator pedal depression amount is smaller than the specified value and is a first value than when the accelerator pedal depression amount is smaller than the specified value and is a second value that is larger than the first value.

2. The control method for the vehicle according to claim 1,
wherein, in the step of setting the deceleration, when the accelerator pedal depression amount is smaller than the specified value, the deceleration that is added to the vehicle is further reduced with a reduction in said accelerator pedal depression amount.

3. The control method for the vehicle according to claim 1,
wherein, in the step of setting the deceleration, when the accelerator pedal depression amount is equal to or larger than the specified value, the deceleration that is added to the vehicle is further reduced with an increase in said accelerator pedal depression amount.

4. The control method for the vehicle according to claim 1,
the vehicle having a generator that is driven by a wheel to generate regenerative power,
the control method for the vehicle further comprising:
a step of causing the generator to generate the regenerative power so as to add the set deceleration to the vehicle.

5. The control method for the vehicle according to claim 4,
the vehicle having a braking device that adds a braking force to a wheel,
the control method for the vehicle further comprising:
a step of causing the braking device to add the braking force so as to add the set deceleration to the vehicle.

6. A vehicle system comprising: a steering angle sensor that detects a steering angle of a steering system; an accelerator sensor that detects an accelerator pedal depression amount; and a processor,
wherein the processor is configured to:
add deceleration that corresponds to the accelerator pedal depression amount to the vehicle when said accelerator pedal depression amount detected by the accelerator sensor is smaller than a specified value that is larger than 0;
determine whether a turning operation of the steering system is performed on the basis of the steering angle that is detected by the steering angle sensor;
add the deceleration to the vehicle so as to control a vehicle posture when it is determined that the turning operation of the steering system is performed; and
reduce the deceleration, which is added to the vehicle at the time when it is determined that the turning operation of the steering system is performed, to be smaller when the accelerator pedal depression amount is smaller than the specified value and is a first value than when the accelerator pedal depression amount is smaller than the specified value and is a second value that is larger than the first value.

7. The control method for the vehicle according to claim 2,
wherein, in the step of setting the deceleration, when the accelerator pedal depression amount is equal to or larger than the specified value, the deceleration that is added to the vehicle is further reduced with an increase in said accelerator pedal depression amount.

8. The control method for the vehicle according to claim 7,
the vehicle having a generator that is driven by a wheel to generate regenerative power,
the control method for the vehicle further comprising:
a step of causing the generator to generate the regenerative power so as to add the set deceleration to the vehicle.

9. The control method for the vehicle according to claim 8,
the vehicle having a braking device that adds a braking force to a wheel,
the control method for the vehicle further comprising:
a step of causing the braking device to add the braking force so as to add the set deceleration to the vehicle.

10. The control method for the vehicle according to claim 3,
the vehicle having a generator that is driven by a wheel to generate regenerative power,
the control method for the vehicle further comprising:
a step of causing the generator to generate the regenerative power so as to add the set deceleration to the vehicle.

11. The control method for the vehicle according to claim 10,
the vehicle having a braking device that adds a braking force to a wheel,
the control method for the vehicle further comprising:
a step of causing the braking device to add the braking force so as to add the set deceleration to the vehicle.

* * * * *